United States Patent [19]
Stevenson, III

[11] Patent Number: 5,889,773
[45] Date of Patent: Mar. 30, 1999

[54] METHOD AND APPARATUS FOR PLACING TIME DIVISION MULTIPLEXED TELEPHONY TRAFFIC INTO AN ASYNCHRONOUS TRANSFER MODE FORMAT

[75] Inventor: K. Martin Stevenson, III, San Rafael, Calif.

[73] Assignee: Alcatel USA Sourcing, L.P., Plano, Tex.

[21] Appl. No.: 777,103

[22] Filed: Dec. 31, 1996

Related U.S. Application Data

[60] Provisional application No. 60/031,970, Nov. 27, 1996, and provisional application No. 60/031,895, Nov. 27, 1996, and provisional application No. 60/031,896, Nov. 27, 1996.

[51] Int. Cl.[6] .................................................. H04L 12/56
[52] U.S. Cl. .......................... 370/352; 370/474; 370/476; 370/487
[58] Field of Search .................................... 370/465, 466, 370/468, 470, 471, 474, 476, 352, 353, 354, 355, 356, 487

[56] References Cited

U.S. PATENT DOCUMENTS

| | | | |
|---|---|---|---|
| 5,365,524 | 11/1994 | Hiller et al. | 370/465 |
| 5,483,527 | 1/1996 | Doshi et al. | 370/465 |
| 5,555,243 | 9/1996 | Kakuma et al. | 370/359 |
| 5,623,491 | 4/1997 | Skoog | 370/466 |

FOREIGN PATENT DOCUMENTS

| | | | |
|---|---|---|---|
| 0544217 | 6/1993 | European Pat. Off. | H04J 3/16 |
| 0722237 | 7/1996 | European Pat. Off. | H04L 12/64 |
| 9429987 | 12/1994 | WIPO | H04L 12/56 |

OTHER PUBLICATIONS

Covington, Jr., et al., "Voice Transport on an ATM Broadband Network", 1989 IEEE, Nov. 1989, pp. 1921–1925.

Gard, et al., "Supporting STM Traffic With ATM—A Switch Implementation", ISS Symposium, Apr. 1995, vol. 1, pp. 62–66.

*Primary Examiner*—Min Jung
*Attorney, Agent, or Firm*—Baker & Botts, L.L.P.

[57] ABSTRACT

A host digital terminal (118) receives telephony traffic from a time division multiplexed (TDM) switch (122) and packet data asynchronous transfer mode (ATM) cells containing packet data information from an ATM switch 116. The host digital terminal (118) converts the telephony traffic into telephony ATM cells (34) and multiplexes the telephony ATM cells with the packet data ATM cells for placement into a synchronous optical network (SONET) frame (38). The host digital terminal (118) transports the SONET frame (38) to an optical network unit (124). The optical network unit (124) demultiplexes the telephony ATM cells (34) from the packet data ATM cells in the SONET frame (38). Packet data information within the packet data ATM cells is extracted and provided to a monitor (132) through a network terminator (126) and a computer or set top unit (130). Telephony traffic is extracted from the telephony ATM cells (34) and provided to telecommunications equipment (128) through the network terminator (126).

12 Claims, 3 Drawing Sheets

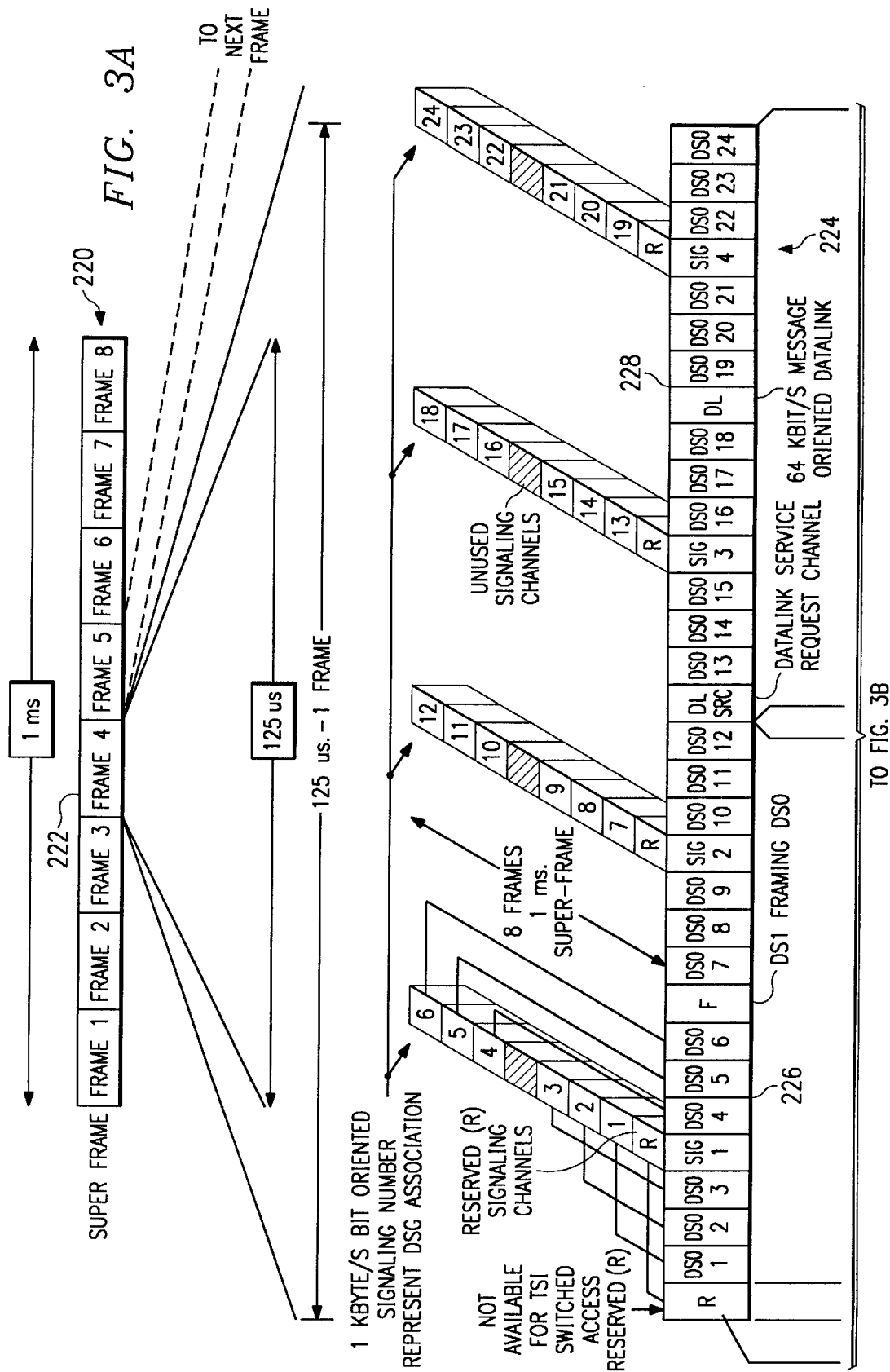

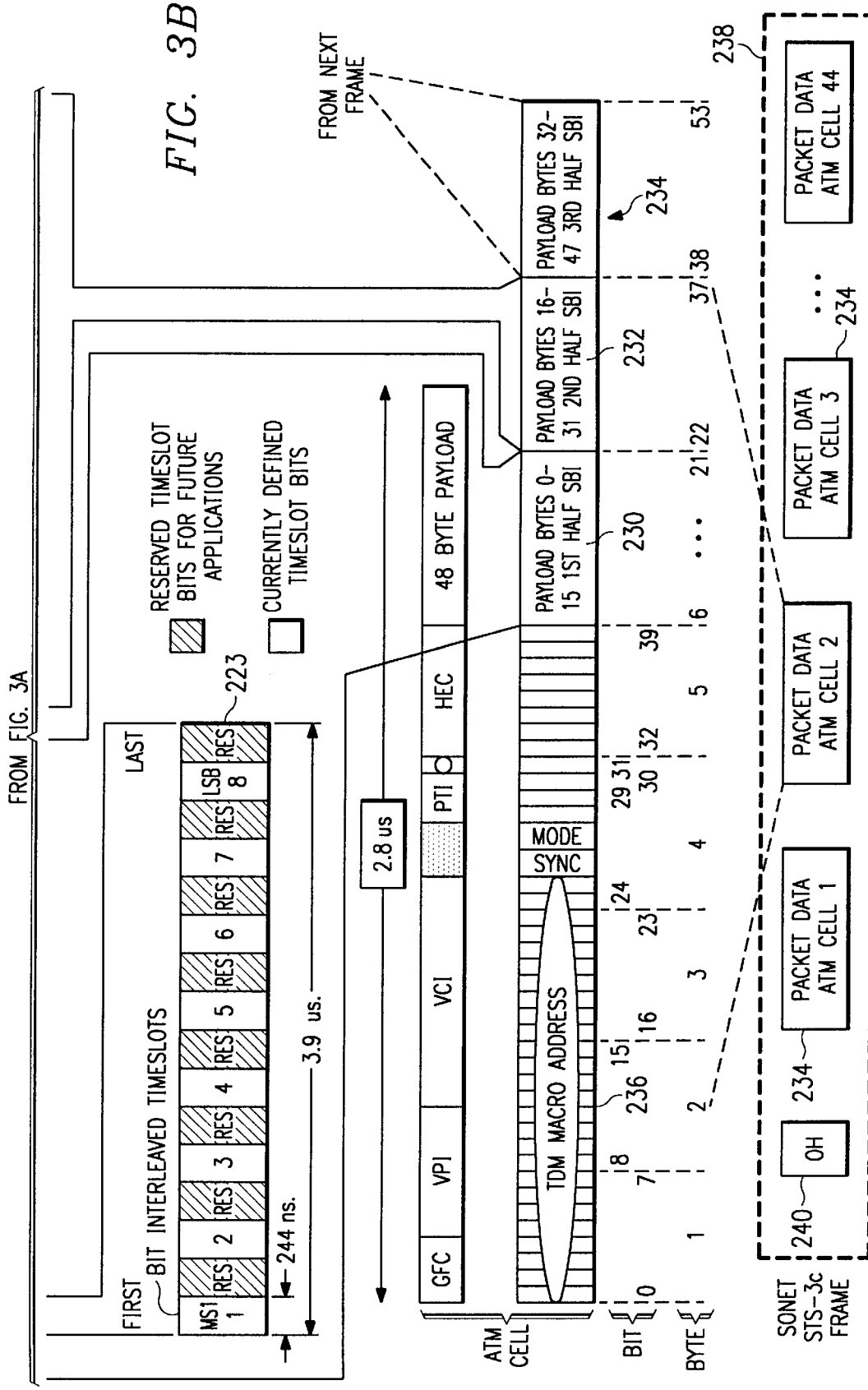

US 5,889,773

METHOD AND APPARATUS FOR PLACING TIME DIVISION MULTIPLEXED TELEPHONY TRAFFIC INTO AN ASYNCHRONOUS TRANSFER MODE FORMAT

TECHNICAL FIELD OF THE INVENTION

The present invention relates in general to telecommunications systems and more particularly to a method and apparatus for placing time division multiplexed telephony traffic into an asynchronous transfer mode format.

RELATED PATENT APPLICATION

This application claims the benefit of U.S. Provisional Application No. 60/031,970, filed on Nov. 27, 1996.

This application claims the benefit of U.S. Provisional Application No. 60/031,895, filed on Nov. 27, 1996.

This application claims the benefit of U.S. Provisional Application No. 60/031,896, filed on Nov. 27, 1996.

BACKGROUND OF THE INVENTION

A fiber to the curb system is designed to deliver both telephony and high data rate packetized data including digitally encoded full motion video. This is delivered to a home or other end user. In order to provide such delivery, telephony and packet data signals must be carried over a fiber optic communication link from a host digital terminal to an optical network unit. However, telephony and packet data signals are inherently different. Packet data signals may be optimally carried in an asynchronous transfer mode—(ATM) cell format. Telephony signals are considered to be optimally carried in a time division multiplexed format. There is no industry standard procedure for carrying signals between a host digital terminal and an optical network unit. Each manufacturer independently determines what transport and multiplexing technology to implement. The transport and multiplexing technology is an important design and implementation choice that affects the performance of services delivered by the system, the cost of the system, the complexity of the design, fault detection identification and diagnosis, manufacturability of the system, as well as other operational aspects of the system. Therefore, it is desirable to be able to transport both packet data and telephony signals across a fiber optic communication link.

SUMMARY OF THE INVENTION

From the foregoing, it may be appreciated that a need has arisen for transporting telephony and packet data signals in a common protocol across a fiber optic communication link. In accordance with the present invention, a method and apparatus for placing time division multiplexed telephony traffic into an asynchronous transfer mode format are provided that substantially eliminate or reduce disadvantages and problems associated with conventional telephony and packet data signal transportation.

According to an embodiment of the present invention, there is provided a method of placing time division multiplexed telephony traffic into an asynchronous transfer mode format that includes receiving time division multiplexed telephony traffic in a plurality of frames each having a first protocol, the first protocol being composed of a 32-byte data stream carrying internal system communications and up to 27 64 Kbps channels of user information, or up to 24 64 Kbps user channels with out of band bit oriented signaling. A first of the plurality of frames is partitioned into a first 16-byte portion and a second 16-byte portion. The first 16-byte portion is placed into a first one-third payload section of a first asynchronous transfer mode cell. The second 16-byte portion is placed into a second one-third payload section of the first asynchronous transfer mode cell. Standard ATM cell header data is placed into the header section of the first asynchronous transfer mode cell. In a packed mode, a first 16-byte portion of a second of the plurality of frames is placed into a third one-third payload section of the first asynchronous transfer mode cell and a second 16-byte portion of the second of the plurality of frames is placed into a first one-third payload section of a second asynchronous transfer mode cell. The second asynchronous transfer mode cell also receives first and second 16-byte portions of a third of the plurality of frames such that three frames are transported by two asynchronous transfer mode cells.

The present invention provides various technical advantages over conventional packet data and telephony signal transportation techniques. For example, one technical advantage is the ability to place telephony traffic into asynchronous transfer mode cells without introducing the delays which result if several telephony data samples from the circuit are placed in the same ATM cell. Another technical advantage is to interleave asynchronous transfer mode cells carrying packet data information with asynchronous transfer mode cells carrying telephony information with the flexibility to adjust the portion of each as traffic demands change. Yet another technical advantage is to carry telephony traffic in asynchronous transfer mode cells in packed or unpacked modes. Other technical advantages may be readily apparent to one skilled in the art from the following figures, description, and claims.

BRIEF DESCRIPTION OF THE DRAWINGS

For a more complete understanding of the present inventions and the advantages thereof, reference is now made to the following description taken in conjunction with the accompanying drawings, wherein like reference numerals represent like parts, in which:

FIGS. 3A–B illustrate the protocol description mapping between the telephony traffic and an asynchronous transfer mode cell format.

DETAILED DESCRIPTION OF THE INVENTION

Figure 1:
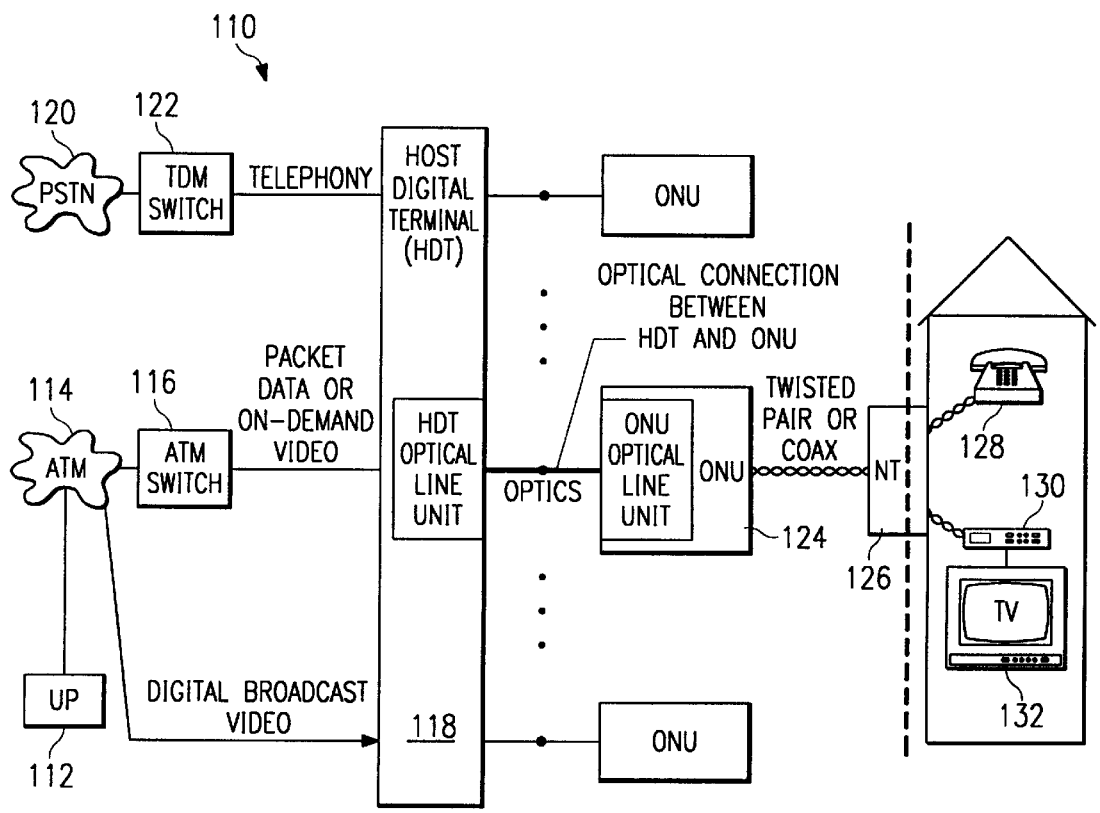
FIG. 1 illustrates a block diagram of a telecommunications network for transporting telephony traffic and packet data information.

FIG. 1 is a block diagram of a telecommunications network 110. Telecommunications network 110 transports video information from information provider 112 through an asynchronous transfer mode (ATM) network 114 and an ATM switch 116 to a host digital terminal 118. Telecommunications network 110 also transports telephony traffic from a public switched telephone network 120 through a time division multiplexed (TDM) switch 122 to host digital terminal 118. Host digital terminal 118 places the telephony traffic and the packet data information into ATM cells for fiber optic transport to an optical network unit 124. Optical network unit 124 extracts the telephony traffic and the packet data information from the ATM cells for transport to a network terminator 126. Network terminator 126 provides the telephony traffic to a subscriber's telecommunications equipment 128 and the packet data information to a subscriber's set top box or computer 130 for viewing by a monitor 132. Host digital terminal 118 also receives ATM cells from optical network unit 124 that may originate from the subscriber and routes telephony traffic for transport through TDM switch 122 to public switched telephone network 120. Host digital terminal may also separate packet data information from the subscriber for transport through ATM switch 116 and ATM network 114 to a Internet service provider or other packet data destination 112.

Figure 2:
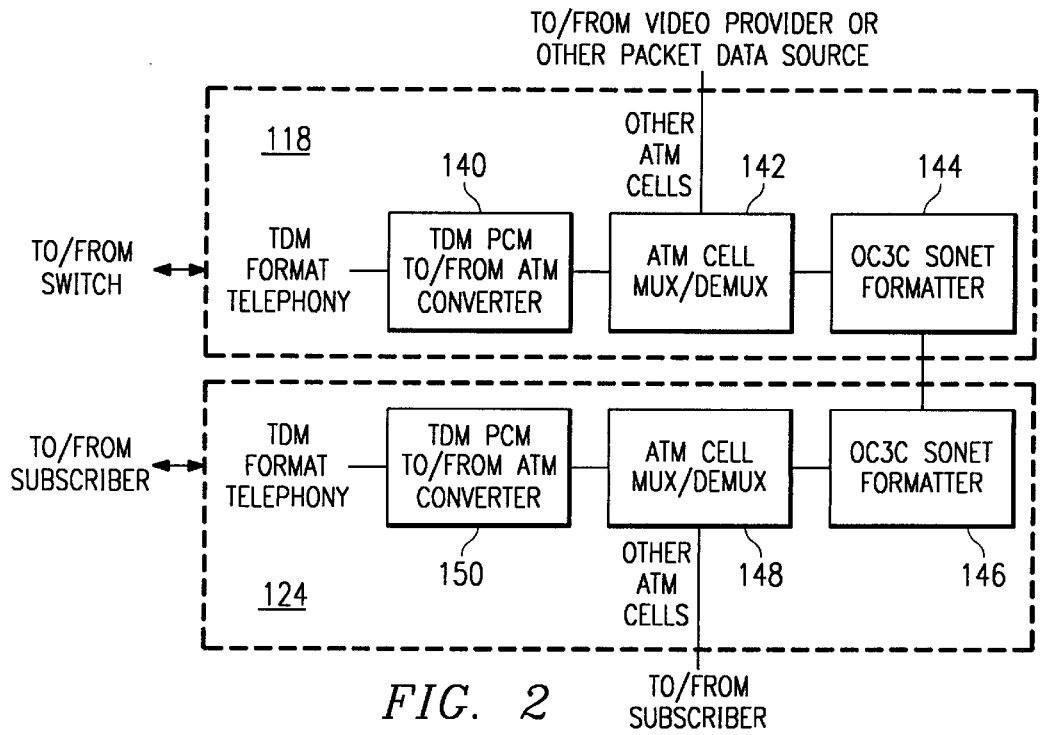
FIG. 2 illustrates a block diagram of the conversion and transportation of the telephony traffic within the telecommunications network.

FIG. 2 shows block diagrams for the conversion and transport of telephony traffic to and with ATM cells. Host digital terminal 118 receives telephony traffic from TDM switch 122 and places the telephony traffic into a TDM pulse code modulated (PCM) format. The TDM PCM format is received at a TDM/ATM converter 140. TDM/ATM converter 140 places the TDM PCM format of the telephony traffic into ATM cells. Telephony ATM cells are multiplexed with packet data ATM cells containing packet data information by an ATM cell multiplexer/demultiplexer 142 and placed into synchronous optical network (SONET) frames for transport to optical network unit 124 over an optical connection by a SONET formatter 144. SONET formatter 144 also receives SONET frames from optical network unit 124 and extracts individual ATM cells from the SONET frames for processing by ATM cell multiplexer/demultiplexer 142. ATM cell multiplexer/demultiplexer 142 separates telephony ATM cells from packet data ATM cells. Packet data ATM cells are transported towards Internet service provider or other packet data destination 112. Telephony ATM cells with telephony traffic are converted into the TDM PCM format of host digital terminal 118 and subsequently transported towards TDM switch 122.

Optical network unit 124 receives SONET frames from SONET formatter 144 of host digital terminal 118 at a SONET formatter 146. SONET formatter 146 extracts individual ATM cells from the SONET frames in preparation for processing by an ATM cell multiplexer/demultiplexer 148. ATM cell multiplexer/demultiplexer 148 separates the telephony ATM cells from the packet data ATM cells and provides packet data information in the packet data ATM cells to the subscriber. The telephony ATM cells are processed by a TDM/ATM converter 150 to extract the TDM PCM format of the telephony traffic in the telephony ATM cells. TDM/ATM converter 150 provides the telephony traffic to the subscriber and receives telephony traffic from the subscriber. Telephony traffic received from the subscriber is placed into ATM cells by TDM/ATM converter 150. Telephony ATM cells generated by TDM/ATM converter 150 are multiplexed with packet data ATM cells containing control information from the subscriber. The multiplexed stream of telephony ATM cells and packet data ATM cells is placed into a SONET frame by SONET formatter 146 for transport to host digital terminal 118.

FIGS. 3A–B show the protocol description mapping for converting time division multiplexed telephony traffic into an asynchronous transfer mode format. Telephony traffic within host digital terminal 118 is carried in a 1-millisecond superframe 220 consisting of eight 125-microsecond frames 222 to permit the transport of bit oriented signaling associated with standard telephony traffic. Each frame 222 has a subscriber bus interface format 224 comprised of a 32-byte timeslot data stream, each timeslot byte having a 16-bit interleaved data format 223 such that two separate bit interleaved data streams are supported by subscriber bus interface format 224. The odd bit positions of the 16-bit interleaved data format 223 carry the actual transported data and the even bit positions are reserved for future expansion. Thus, only one of the separate bit interleaved data streams will be considered here. Subscriber bus interface format 224 carries internal system communication, and the user information with out-of-band bit oriented signaling for twenty-four DS-0 signals or one VT1.5 signal.

The 32-byte timeslot data stream of subscriber bus interface format 224 is divided into overhead channels of a reserved byte R, bit oriented signaling bytes SIG, internal datalink bytes SRQ and DL, and a framing byte 25, and data channels of digital signal level zero signal (DS-0) channel bytes 01-24. The twenty-four DS-0 data channel bytes are carried in a pulse code modulated format and distributed across the 125-microsecond frame 222 in sets of three channels in order to evenly distribute the overhead channels across the 125-microsecond frame 222 and permit minimal buffering for conversion to digital signal level one (DS-1) signals. The data for the DS-0 channel bytes are placed in subscriber bus interface format 224 in an inverted standard μ-law format in order to provide quiet pulse code modulation when a line card incorporating subscriber bus interface format 222 is removed or has a loss in power. Bit oriented signaling bytes SIG transport the standard AB or ABCD signaling used on T1 systems to support 4-state and 16-state signaling modes as well as the unique signaling mode described in Bellcore TR-TSY-000008. Datalink bytes SRQ and DL provide a communication capability with a control processor. A unique byte value is transported in the R and SRQ bytes of the eighth frame 222 of a superframe 220 in order to identify a boundary for each superframe 220.

Subscriber bus interface format 224 is partitioned into two 16-byte portions 226 and 228. 16-byte portions 226 and 228 are placed in a first one-third payload section 230 and a second one-third payload section 232 of an asynchronous transfer mode cell 234. In an unpacked mode, each frame 222 of a superframe 220 is carried in its own asynchronous transfer mode cell 234. In a packed mode, three frames 222 are carried in two asynchronous transfer mode cells 234. Standard ATM cell addressing techniques are used to identify each ATM cell as belonging to a particular virtual circuit. The mux/demux is configured to use a particular format (packed TDM, unpacked TDM, or packet data) with a particular virtual circuit. Asynchronous transfer mode cells are transported in a SONET STS-3c frame 238. Each SONET STS-3c frame 238 transports an overhead field 240 and fourty-four asynchronous transfer mode cells 234.

For a specific example of a device that places telephony traffic into asynchronous transfer mode cells, please refer to copending U.S. patent application Ser. No. 08/978,969, entitled "Optical Network Unit for Communicating Telephony and Video Information", which is hereby incorporated herein by reference. An example of a telecommunications switching unit that performs conversion of telephony traffic to and from asynchronous transfer mode cells can be found in copending U.S. patent application Ser. No. 08/980, 271, entitled "Telecommunications Switch for Providing Telephony Traffic Integrated with Video Information Services", which is hereby incorporated by reference herein.

Thus, it is apparent that there has been provided, in accordance with the present invention, a method and apparatus for placing time division multiplexed telephony traffic into an asynchronous transfer mode format that satisfy the advantages set forth above. Although the present invention has been described in detail, it should be understood that various changes, substitutions, and alterations can be made herein. Other examples are readily ascertainable by one skilled in the art and can be made herein without departing from the spirit and scope of the present invention as defined by the following claims.

What is claimed is:

1. A method of placing time division multiplexed telephony traffic into an asynchronous transfer mode format, comprising steps of:

receiving time division multiplexed telephony traffic in a plurality of frames each having a first protocol, the first protocol being composed of a 32-byte data stream carrying internal system communications, user information, and user bit oriented signaling for a plurality of telephony traffic channels;

partitioning a first of the plurality of frames into a first 16-byte portion and a second 16-byte portion;

placing the first 16-byte portion of the first of the plurality of frames into a first one-third payload section of a first asynchronous transfer mode cell;

placing the second 16-byte portion of the first of the plurality of frames into a second one-third payload section of the first asynchronous transfer mode cell;

generating header data for placement into a header section of the first asynchronous transfer mode cell.

2. The method of claim 1, further comprising a step of:

multiplexing the first asynchronous transfer mode cell into a synchronous optical network frame, the synchronous optical network frame carrying a plurality of asynchronous transfer mode cells.

3. The method of claim 2, wherein the synchronous optical network frame has asynchronous transfer mode cells containing narrowband telephony traffic and asynchronous transfer mode cells carrying broadband packet data traffic.

4. The method of claim 1, further comprising steps of:

partitioning a second of the plurality of frames into a first 16-byte portion and a second 16-byte portion;

placing the first 16-byte portion of the second of the plurality of frames into a third one-third payload section of the first asynchronous transfer mode cell;

placing the second 16-byte portion of the second of the plurality of frames into a first one-third payload section of a second asynchronous transfer mode cell;

generating header data for placement into a header section of the second asynchronous transfer mode cell.

5. The method of claim 4, further comprising steps of:

partitioning a third of the plurality of frames into a first 16-byte portion and a second 16-byte portion;

placing the first 16-byte portion of the third of the plurality of frames into a second one-third payload section of the second asynchronous transfer mode cell;

placing the second 16-byte portion of the third of the plurality of frames into a third one-third payload section of the second asynchronous transfer mode cell.

6. The method of claim 5, further comprising a step of:

using standard ATM cell addressing techniques to indicate the content and destination of the cells indicating that telephony traffic is being transferred in a packed mode, the packed mode indicating that three frames are transported by two asynchronous transfer mode cells.

7. The method of claim 1, further comprising steps of:

partitioning subsequent frames into respective first and second 16-byte portions;

placing first and second 16-byte portions of each frame into individual asynchronous transfer mode cells, each asynchronous transfer mode cell carrying first and second 16-byte portions of a unique frame.

8. An apparatus for placing time division multiplexed telephony traffic into asynchronous transfer mode cells, comprising:

a converter operable to receive a plurality of frames of telephony traffic, each frame partitioned in a subscriber bus interface format having a 32-byte timeslot data stream, the converter operable to partition each frame into two 16-byte portions, the converter operable to place a first one of the 16-byte portions into a first one-third section of an asynchronous transfer mode cell and a second one of the 16-byte portions into a second one-third section of the asynchronous transfer mode cell.

9. The apparatus of claim 8, further comprising:

a cell multiplexer and demultiplexer operable to receive telephony asynchronous transfer mode cells from the converter and packet data asynchronous transfer mode cells from a packet data provider, the cell multiplexer and demultiplexer operable to interleave telephony asynchronous transfer mode cells with video asynchronous transfer mode cells onto a single cell stream.

10. The apparatus of claim 8, further comprising:

a synchronous optical network formatter operable to receive the cell stream from the cell multiplexer and demultiplexer, the synchronous optical network formatter operable to partition the cell stream into synchronous optical network frames for transmission onto a fiber optic communication link.

11. The apparatus of claim 8, wherein the converter is operable to place a first one of the 16-byte portions of a following frame into a third one-third section of the asynchronous transfer mode cell and a second one of the 16-byte portions of the following frame into a first one-third section of a subsequent asynchronous transfer mode cell.

12. The apparatus of claim 11, wherein the converter is operable to place a first one of the 16-byte portions of a subsequently following frame into a second one-third section of the subsequent asynchronous transfer mode cell and a second one of the 16-byte portions of the subsequently following frame into a third one-third section of the subsequent asynchronous transfer mode cell such that three frames are transported in two asynchronous transfer mode cells.

* * * * *